United States Patent [19]

Ezis

[11] 4,264,548
[45] Apr. 28, 1981

[54] METHOD OF MAKING SILICON NITRIDE BASED CUTTING TOOLS-I

[75] Inventor: Andre Ezis, Grosse Ile, Mich.

[73] Assignee: Ford Motor Company, Dearborn, Mich.

[21] Appl. No.: 105,830

[22] Filed: Dec. 20, 1979

[51] Int. Cl.³ ............................................. C04B 35/58
[52] U.S. Cl. ........................................ 264/65; 51/307; 51/309; 106/65; 106/73.5; 264/66; 264/332
[58] Field of Search .................. 106/65, 73.5; 51/307, 51/309; 264/65, 66, 332

[56] References Cited

U.S. PATENT DOCUMENTS

| | | | |
|---|---|---|---|
| 3,830,652 | 8/1974 | Gazza | 106/73.5 |
| 3,837,871 | 9/1974 | Weaver | 106/65 |
| 3,950,464 | 4/1976 | Masaki | 106/73.5 |
| 3,969,125 | 7/1976 | Komeya et al. | 106/73.5 |
| 4,071,371 | 1/1978 | Milberg et al. | 106/65 |
| 4,102,698 | 7/1978 | Lange et al. | 106/73.5 |
| 4,143,107 | 3/1979 | Ishii | 106/73.5 |

Primary Examiner—John Parrish
Attorney, Agent, or Firm—Joseph W. Malleck; Olin B. Johnson

[57] ABSTRACT

A method of making a unitary silicon nitride comprising object and tool is disclosed. A uniform powder mixture of $Si_3N_4$ containing $SiO_2$ as an oxide coating, 4–12% by weight $Y_2O_3$, and 0.50–2.5 $Al_2O_3$ is prepared. The mixture is hot pressed at a temperature of 1,680°–1,750° C. under a pressure and for a period of time sufficient to produce at least 99.0% (preferably at least 99.5%) of full theoretical density in the mixture to form a pressed object. The heating and pressure is then relieved and the object cooled. The object is heat treated by holding at a temperature in the range of 1,000°–1,400° C. without mechanical pressure for at least 5 minutes but for a time sufficient to provide a nucleating reaction in secondary phases formed as a result of hot pressing. The heat treatment can take place either as an interruption of the cooling cycle or as a subsequent reheat cycle after cooling to room temperature.

11 Claims, No Drawings

METHOD OF MAKING SILICON NITRIDE BASED CUTTING TOOLS-I

BACKGROUND OF THE INVENTION

Silicon nitride based materials, which have been hot pressed or sintered to a ceramic, have been recognized for their heat resistant qualities useful in structural members and in some cases for use as a cutting tool. However, silicon nitride, as a single substance, is not easily sintered, even under pressure, without the addition of sintering aids. Sintering aids are substances that form secondary compounds with silicon nitride or with silicon oxide present on the surface of the silicon nitride granules, which compounds form an intergranular binder assisting in the achievement of full density and greater strength properties under ambient conditions.

With known processing techniques, it has been recognized that the substances formed by such sintering aids are harmful to high temperature use of the base ceramic since the compounds are amorphous or glassy in nature.

One attempt by the prior art (see U.S. Pat. No. 4,046,580) to eliminate the glassy phase has consisted of stripping or eliminating the silicon oxide coating on the silicon nitride granules thereby forcing any chemical reaction with the pressing aid to be with the silicon nitride. The resulting secondary phase of this attempt tends to be less glassy, but unfortunately is less useful to cutting tool applications. More useful phases would be silicon oxynitrides such as $Y_{10}Si_7O_{23}N_4$, or $Y_1Si_1O_2N_1$. These useful secondary phases, which are formed as a result of a chemical reaction between elements of the ternary system $Si_3N_4.Y_2O_3.SiO_2$, make processing more economical and promote enhanced strength and thermal shock properties for a ceramic material that is to be used for cutting of cast iron.

SUMMARY OF THE INVENTION

The invention relates to a method of making a unitary silicon nitride comprising object and to a method of making a silicon nitride comprising cutting tool. The method of making the $Si_3N_4$ comprising object includes the steps of:

(a) uniformly mixing silicon nitride power containing $S_iO_2$ as an oxide surface coating, 4-12% by weight $Y_2O_3$ powder, and 0.50-2.5% $Al_2O_3$, (b) hot pressing the mixture at a temperature of 1680°-1750° C. under a pressure and for a period of time sufficient to produce at least 99.0% of full theoretical density in said mixture to form a pressed object, (c) relieving said heating and pressure on said object and cooling, and (d) heating treating said object by holding at a temperature in the range of 1,000°-1,400° C. without mechanical pressure for at least 5 minutes but for a time sufficient to provide a nucleating reaction in secondary phases formed as a result of hot pressing. The resulting object will contain fully crystallized secondary phases of $Si_3N_4.SiO_2.Y_2O_3$. The object when shaped as a cutting tool, is particularly useful in the machine cutting of cast iron.

It is advantageous in carrying out the method that: in step (d) the heat treatment be carried out for 10-300 minutes, the silicon nitride powder contain 0.5-3.5% $SiO_2$, steps (b) through (d) be carried out under a flowing nitrogen atmosphere, and the mixture be precompacted under a light pressure of about 500 psi between steps (a) and (b).

DETAILED DESCRIPTION

An illustrative method mode for carrying out the inventive method of making silicon nitride based cutting tools for metals is as follows.

(1) A uniform powder mixture is prepared comprising essentially alpha phase silicon nitride powder (preferably at least 85% alpha phase) carrying 0.5-1.5% silicon oxide on the surface of the silicon nitride particles and a sintering aid consisting of 4-12% $Y_2O_3$. Alumina in an amount of 0.5-2.5% is added by ball milling attrition. It has been found that the addition of up to 2.5% alumina catalyzes a nucleating reaction during subsequent heat treatment to provide the seeds or nucleii for crystallization of secondary phases. This is advantageously added by adapting the milling media to consist essentially of alumina, except for up to 10% $SiO_2$. Thus, during the ball milling operation, there is a transfer, during each particle impact with the milling media, of a tiny portion of alumina. These particle transfers can build up over a predetermined period of time so that the powder mixture will uniformly contain a desired alumina content. The milling time to achieve this specific transfer of alumina, so that it does not exceed 2.5%, is determined by routine experimental experience. Such experience has shown that there will be a corresponding milling ball media wear in the range of 0.50-2.5 weight percent.

The content of $SiO_2$ on the silicon nitride powder may be indirectly determined by atomic activation analysis. The major impurities in the silicon nitride powder are preferably controlled in the following manner: less than 0.5% iron, less than 0.01% calcium, less than 0.4% aluminum, and less than 2.0% $O_2$. It is advantageous if the cation impurities are limited to 0.5% or less, excluding free silicon and $O_2$. The average particle size for the silicon nitride powder is preferably controlled or selected to be 2.0-2.5 microns. The particle size is preferably determined by the X-ray sedimentation method. With respect to yttria powder, such powder is preferably controlled to have a chemistry of 99.9% pure, and its particle size is controlled to about −325 mesh.

It is preferred that the mixture be milled in a ball milling device so that the final average particle size of the mixture will be in the range of 1.0-1.7 microns. To this end, the powder ingredients are placed in a milling device along with the introduction of $Al_2O_3$ milling media. It is typical to employ a wetting lubricant such as methanol which may be in the ratio of 1:1 with the silicon nitride powder. The powder mixture is sufficiently ground and milled for a predetermined time, which depends on mill speed, particle size of the starting powders, and the average particle size to be achieved. The mixture is then preferably dried and subjected to a screening operation preferably using a 100 mesh scrren. The milled mixture should contain 0.75-2.5% of the alumina milling media.

(2) The mixture is then subjected to hot press sintering to effect agglomeration and a density of at least 99.0%, preferably 99.5% or more or full theoretical density. It is preferred that such hot press sintering be carried out by the use of hot pressing equipment comprising a graphite die assembly into which the powder mixture is inserted, the assembly being induction heated to the desired temperature. It is typical to employ a pressing force of about 4,500 psi, although a range of between 3,500 and 5,000 psi is useful when using $Y_2O_3$ as a pressing aid. The temperature to which such silicon nitride mixture is heated is about 1,680°–1,750° C. for a period of time which can be as short as 5 minutes but can be as long as economically justified while achieving substantially full density which is defined herein to mean 99.5% or more of theoretical density advantageously the period may be 15–45 minutes.

It is preferred, in carrying out the second step of the process, that the graphite assembly be air blown to a clean condition and coated with a boron nitride slurry to a coating thickness of about 0.002 inches prior to the insertion of the powder mixture and prior to hot pressing. It is preferred that the powder mixture, after having been inserted into the coated graphite dies, be precompacted under a pressure of about 500 psi prior to the introduction of any heat. When the pressure dial indicator stablizies, the pressure then is advantageously increased to 4,500 psi at approximately the rate of 1,000 psi per minute. When this ultimate pressure condition is reached, heat is administered by induction heating which increases the graphite die chamber to a temperature of about 1,740° C. Such temperature setting is held throughout the hot pressing run. The run is continued until the ram movement for the graphite die undergoes no more than 0.002 inches travel during a 15 minute interval and essentially stops.

(3) When ram movement essentially stops, the pressure and heat are relieved and the object is preferably cooled by flowing nitrogen with the open die assembly. Any cooling rate can be utilized as long as thermal shock of the pressed body is avoided.

(4) The object is heat treated in the temperature zone of 1,000°–1,400° C., either during cooling but before descending to 1,400° C. or after cooling to room temperature with subsequent reheating. The object is held in said temperature range of 1,000°–1,400° C. without mechanical pressure for at least five minutes, but for a time sufficient to provide a nucleating reaction in secondary phases formed as a result of hot pressing.

(a) In the preferred mode, the heat treating step is preceded by cooling the object to room temperature preferably at a rate of 100° C./minute. The object is then reheated in a controlled atmosphere furnace, preferably containing $N_2$. The temperature is raised in the furnace until the object experiences a temperature in the range of 1,000°–1,400° preferably about 1,300° C. Transient temperature movement within the range of 1,000°–1400° C. should preferably not be greater than 10° C./minute. The object is held in said temperature range for a time period sufficient to provide a nucleating reaction in secondary phases. This will require a period of at least 5 minutes with a maximum limit imposed by economics. It is preferable to employ a period of 10–300 minutes, and optimally 15–45 minutes. This time at which the object is subjected to high temperatures is considerably shorter than with prior art methods wherein 6–8 hours is typical. Here, the hot press sinter time is desirably 15–45 minutes; the combined time herein is about 1.5 hours, considerably shorter than the prior art.

A specific example of heat treatment is to heat for 2.5 hours up to a temperature of 1,300° C.; the object is held an additional 2 hours at 1,300° C., and cooled to 1,000° C. over a period of one hour. The total time in the zone of 1,000°–1,400° C. was 5 hours.

The hot pressing step (2) will produce a silicon nitride matrix having amorphous (glassy) secondary phases residing in the intergranular boundaries. These glassy phases are converted to crystalline phases as a result of the nucleating reaction of the subsequent heat treatment. The product resulting from the practice of the preferred mode will exhibit a secondary phase constituent which will consist of one or more of three crystallized forms in the final product. Such forms of secondary phase comprise the group consisting of $5Y_2O_3.4SiO_2.Si_3N_4$; $2Y_2O_3.SiO_2.Si_3N_4$; and $Y_2O_3.SiO_2$. Two of these secondary phases are silicon oxynitrides and the other is a silicon oxide. The molecular formulas for each of the two oxynitrides are $Y_{10}Si_7O_2N_4$ and $Y_1Si_1O_2N_1$. These oxynitrides will, in most cases, occupy approximately 80% of the secondary phase present in the resulting product and the silicon oxide will, in most cases, occupy the remaining 20% of the product secondary phase. The silicon nitride in the final product will be of the beta type, the conversion from alpha to beta occurring typically before full density is achieved. In the case where aluminum oxide is used as an intended additive in the range of up to 2.5%, the final product will have 100% beta silicon nitride containing aluminum atoms.

(b) Alternatively, the method may follow steps (1) and (2), but in step (3) the cooling may be arrested when the temperature of the object descends to the zone of 1,400° C.–1,000° C. The object is then held within this zone, without pressure, for at least 5 minutes but for a period of time to provide a nucleating reaction in the secondary phases formed as a result of hot pressing. Preferably the time period may be 10–300 minutes and optimally for 15–45 minutes. The secondary phases form an amorphous (glassy) phase during cooling and prior to descending through the 1,400°–1,100° C. range. The glassy phase, when in the temperature zone is nucleated so that upon subsequent further cooling, substantially 100% crystalline secondary phases reside in the grain boundary of the resulting product.

I claim:

1. A method of making a unitary silicon nitride comprising object by the steps comprising:
   (a) uniformly mixing silicon nitride powder containing $SiO_2$ as an oxide surface coating, 4–12% by weight $Y_2O_3$ powder, and 0.50–2.5% $Al_2O_3$,
   (b) hot pressing the mixture at a temperature of 1,680°–1,750° C. under a pressure and for a period of time sufficient to produce at least 99.0% of full theoretical density in said mixture to form a pressed object
   (c) relieving said heating and pressure on said object and cooling and
   (d) heat treating said object by holding at a temperature in the range of 1,000°–1,400° C. without mechanical pressure for at least 5 minutes but sufficient to provide a nucleating reaction in secondary phases formed as a result of hot pressing.

2. The method as in claim 1 in which; the cooling step (c) is carried out to room temperature and said object is reheated to the temperature of step (d).

3. The method as in claim 1 in which the cooling of step (c) is interrupted before the temperature of the object descends through the temperature range of 1,400°–1,000° C. and step (d) is carried out.

4. The method as in claim 1 in which step (d) is carried out for a period of time of 10–300 minutes.

5. The method as in claim 1 in which said mixture is precompacted under a light pressure of about 500 psi and between steps (a) and (b).

6. The method as in claim 1 in which steps (b) through (c) are carried out under a flowing nitrogen atmosphere.

7. The method as in claim 1 in which said silicon nitride powder contains 0.5–3.5% $SiO_2$.

8. A method for making a cutting tool as in claim 1 which additionally comprises the step of shaping said object as a cutting tool.

9. The method as in claim 1 in which the hot pressing is carried out for a period of 15–45 minutes.

10. A method of making a unitary silicon nitride comprising object by the steps comprising:

(a) uniformly mixing silicon nitride powder containing $SiO_2$ as an oxide surface coating, 4–12% by weight $Y_2O_3$ powder; and 0.50–2.5% $Al_2O_3$, (b) hot pressing the mixture at a temperature of 1,680°–1,750° C. under a pressure and for a period of time sufficient to produce at least 99.0% of full theoretical density in said mixture to form a pressed object, (c) relieving said heating and pressure on said object and cooling, and (d) heat treating said object by holding at a temperature in the range of 1,000°–1,400° C. without mechanical pressure for at least 5 minutes but sufficient to provide a nucleating reaction in secondary phases formed as a result of hot pressing to form a multicrystalline phase object.

11. The method as in claim 10 in which the hot pressing is carried out for a period of 15–45 minutes.

* * * * *